G. C. BUCK, DEC'D.
M. E. BUCK, ADMINISTRATRIX.
CURRENT METER.
APPLICATION FILED MAR. 18, 1911.
1,034,399.
Patented July 30, 1912.
4 SHEETS—SHEET 3.
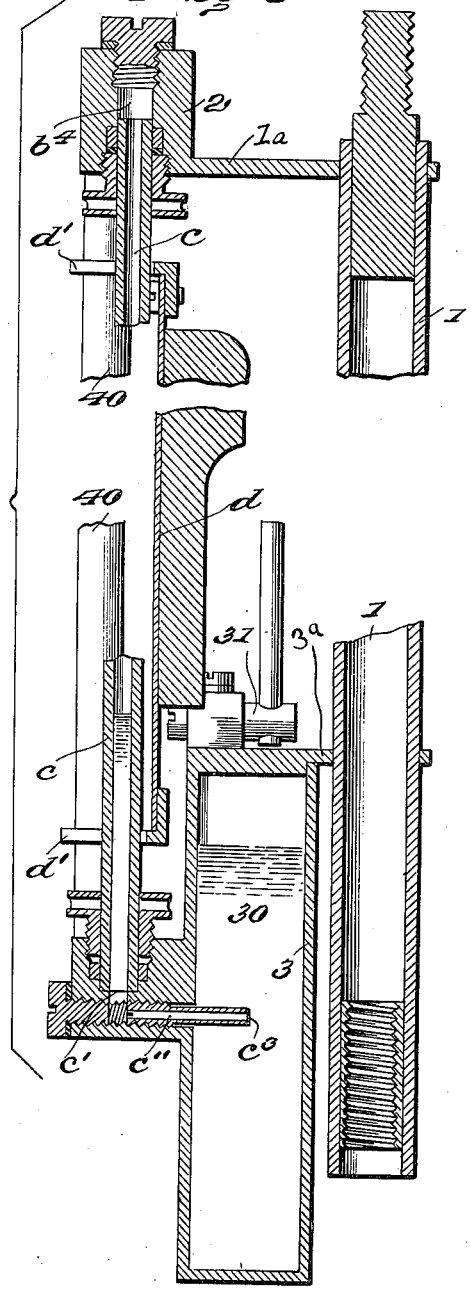
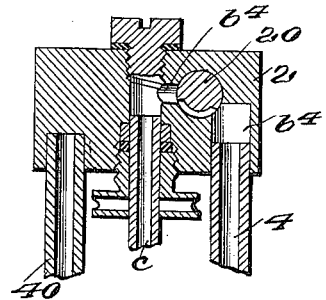
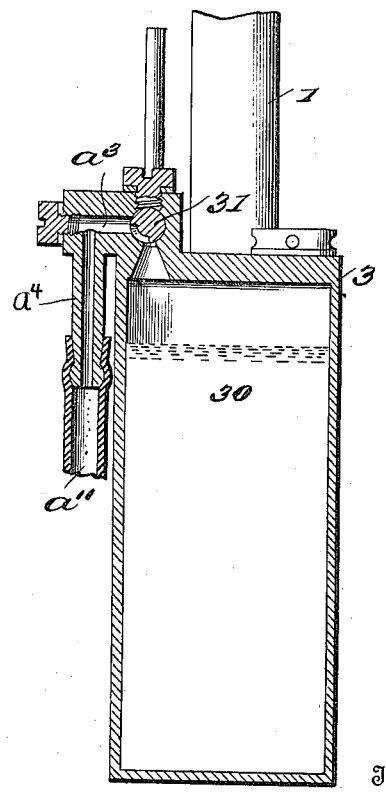
Witnesses
W. A. Williams.
E. R. Peck
Inventor
George C Buck
By Hubert Peck
Attorney

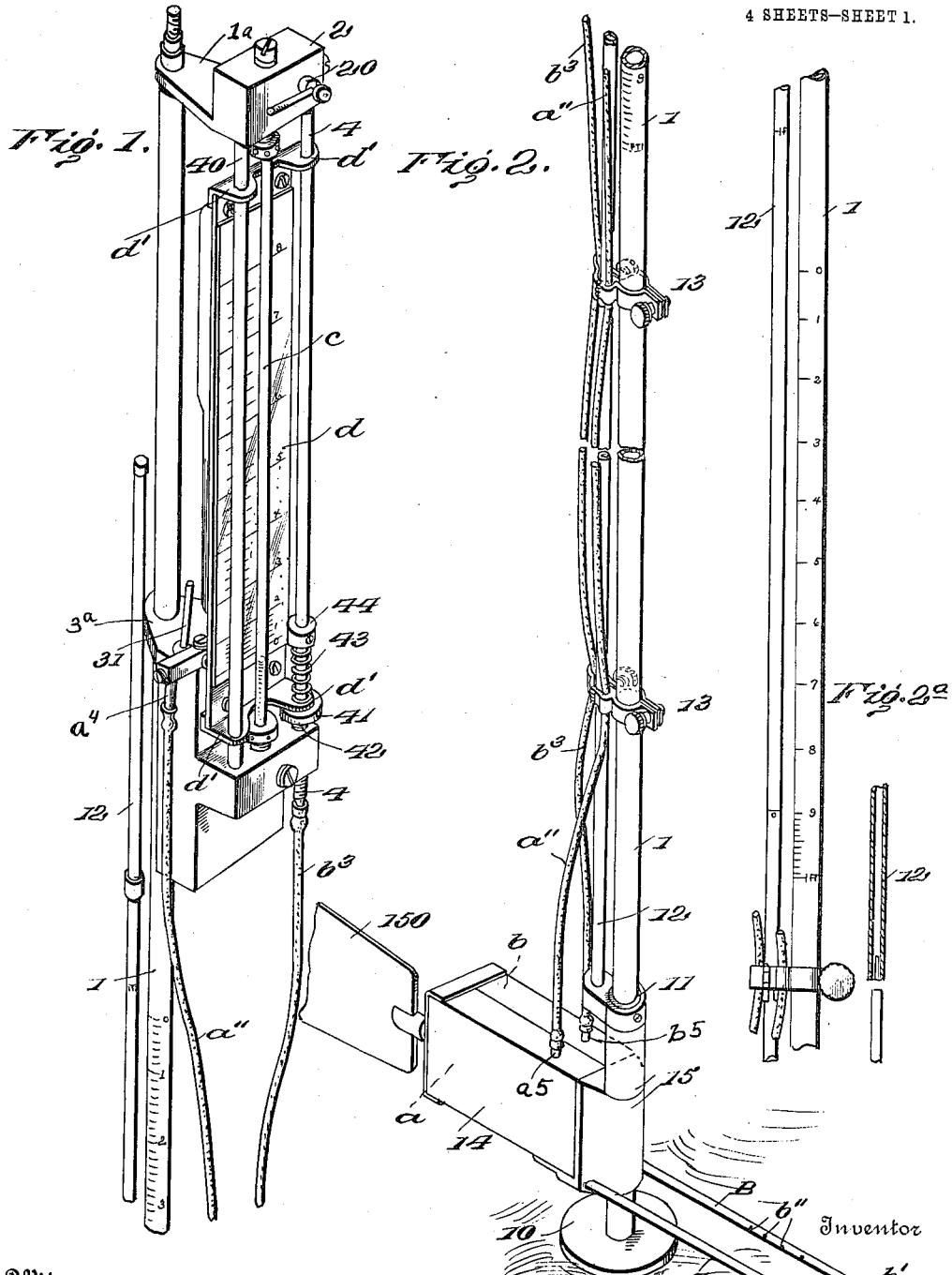

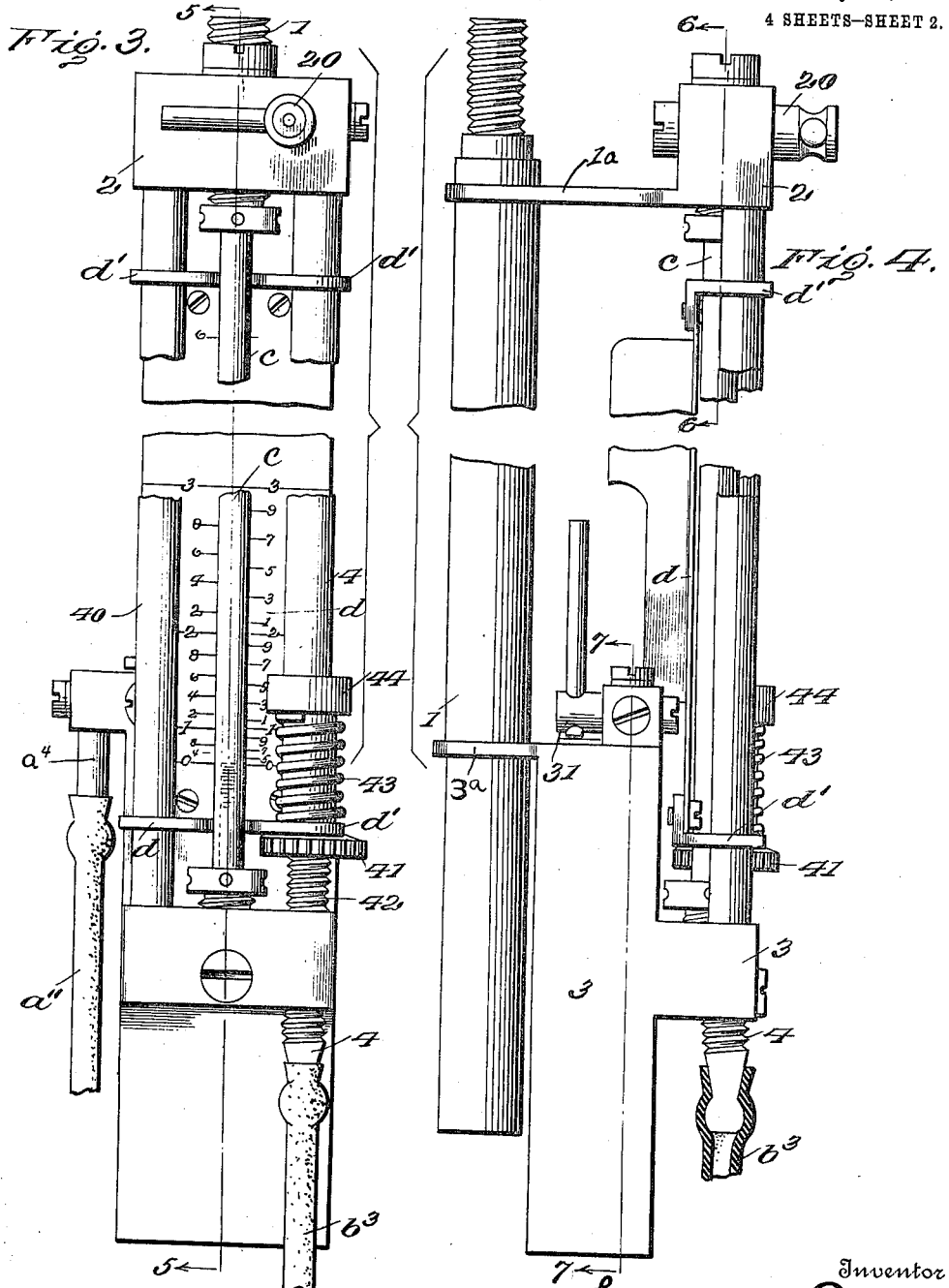

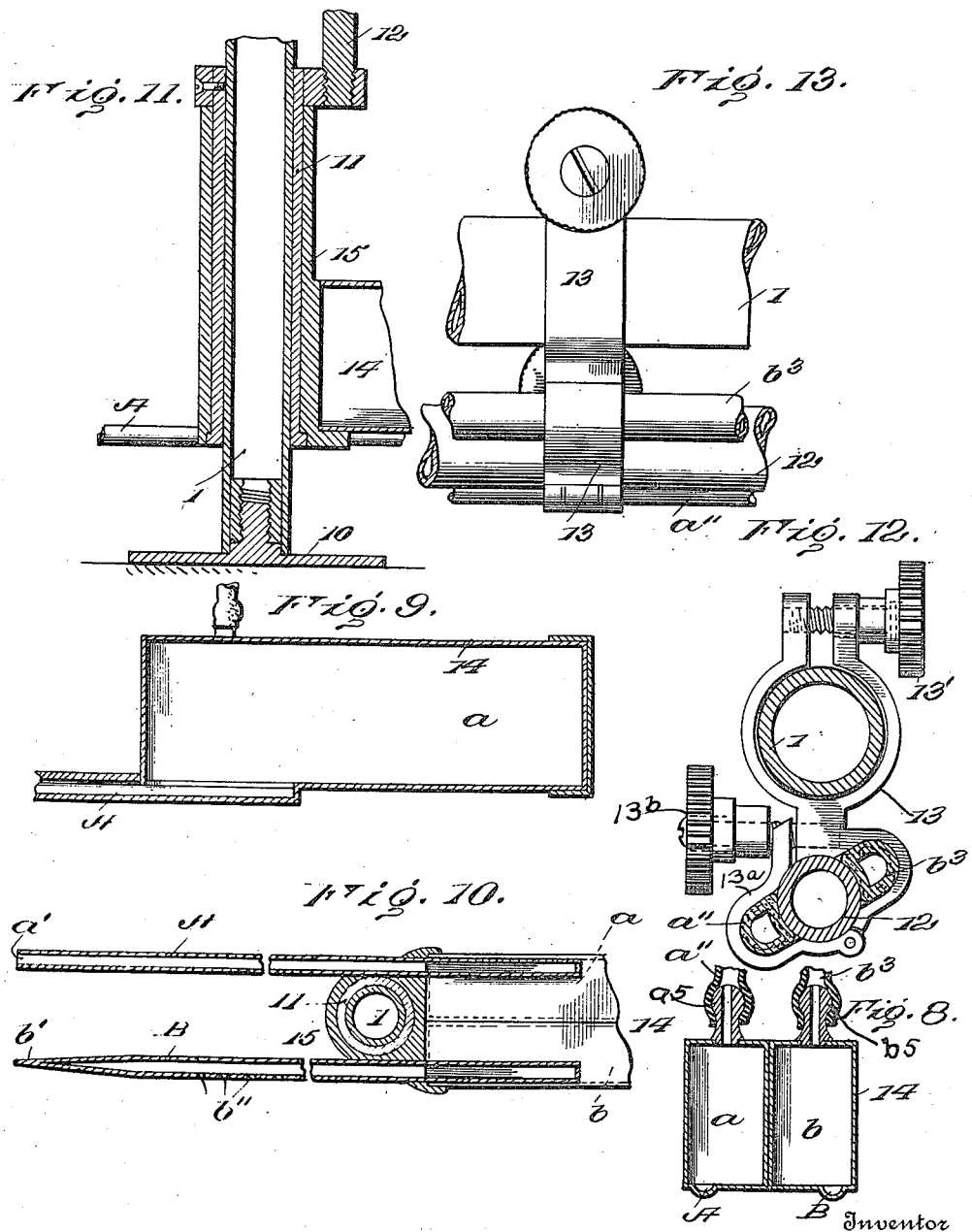

UNITED STATES PATENT OFFICE.

GEORGE CLARK BUCK, OF COLORADO SPRINGS, COLORADO; MARGARET E. BUCK ADMINISTRATRIX OF SAID GEORGE CLARK BUCK, DECEASED.

CURRENT-METER.

1,034,399.  Specification of Letters Patent.  Patented July 30, 1912.

Application filed March 18, 1911. Serial No. 615,326.

*To all whom it may concern:*

Be it known that I, GEORGE CLARK BUCK, a citizen of the United States, residing at Colorado Springs, El Paso county, Colorado, have invented certain new and useful Improvements in Current-Meters; and I do hereby declare the following to be a full, clear, and exact description of the invention, such as will enable others skilled in the art to which it appertains to make and use the same.

This invention relates to certain improvements in and relating to current meters and the like; and the objects and nature of the invention will be readily understood by those skilled in the art in the light of the following explanation of the accompanying drawings illustrating what I now consider to be my preferred embodiment from among other formations, arrangements and construction within the spirit and scope of my invention.

An object of the invention is to provide improvements in current meters embodying a scale graduated to indicate current velocity directly by reading the level of an indicating body of fluid elevated by the pressure of the velocity head of the fluid under observation plus the pressure of the static head of the fluid at the observation depth, said fluid being elevated by said combined pressures in opposition to the pressure of said static head, whereby the level of the indicating fluid is the result of the difference between the static head pressure at the observation depth and the combined pressures of the velocity and static heads.

A further object of the invention is to provide an improved current meter embodying instrumentalities whereby current velocity readings or indications can be attained by balancing a column of fluid by and between the static head pressure of the flowing liquid at the observation depth, and the combined pressures of the velocity head and said static head of the liquid under observation.

A further object of the invention is to provide a current meter embodying instrumentalities whereby the velocity and static head pressures of the flowing liquid are transmitted to an indicating body through the medium of confined air or other gaseous fluid.

A further object of the invention is to provide a current meter embodying instrumentalities whereby separate confined bodies of gaseous fluid, such as air, can be separately subjected to the combined velocity and static head pressures of the flowing liquid at the observation depth, and to the static head pressure at the observation depth, and whereby said separate bodies of gaseous fluid will separately transmit said pressures to and act in opposition on a current velocity indicating body so that the indicating position assumed by said body under the influence of said oppositely acting pressures will be approximately due to the difference between the pressures of said oppositely acting bodies of gaseous fluid.

A further object of the invention is to provide certain improvements in construction, arrangements of parts and combinations of elements, whereby a highly efficient and advantageous current meter will be produced.

The invention consists in certain novel features in construction, in arrangement of parts and combinations of elements as more fully and particularly pointed out hereinafter.

Referring to the accompanying drawings:—Figure 1, is a perspective view of the upper portion of the meter. Fig. 2, is a detail perspective view of the lower portion of the meter. Fig. 2ª, is a detail elevation of portions of the meter supporting rod or pole and the lifting rod for the normally submerged air box showing the depth indicating graduations on the supporting rod and the index mark on the lifting rod; also a detail view of the sections of the lifting rod separated, one section being shown in longitudinal section. Fig. 3, is an enlarged front elevation of the upper portion of the meter, parts being broken away. Fig. 4, is a front elevation of the parts shown by Fig. 3. Fig. 5, is a vertical longitudinal section taken in the plane of the line 5—5, Fig. 3. Fig. 6, is a vertical section in the plane of the line 6—6, Fig. 4. Fig. 7, is a vertical section in the plane of the line 7—7, Fig. 4. Fig. 8, is a detail cross sectional view of the normally submerged air box. Fig. 9, is a detail longitudinal vertical sectional view of said air box taken longitudinally of one of the chambers thereof. Fig. 10, is a detail bottom plan of a portion of the air box showing the two liquid tubes thereof in longitudinal horizontal section and the hub and supporting rod or pole in cross section. Fig. 11, is a detail vertical section of the lower portion of the supporting rod or pole and the air box hub, portions of the box appearing. Fig. 12, is a detail cross section through the supporting rod, lift rod and air tubes, showing a clamp in top plan. Fig. 13, is a side elevation of the structure illustrated by Fig. 12.

In the particular example illustrated, in the accompanying drawings, I provide an elongated rod or portable supporting pole 1, carrying the various parts of the apparatus and by which various parts of the meter are held submerged while observations are being taken. At its lower end this carrying rod 1, can be provided with a suitable foot or base 10. On the portion of the rod to be submerged, that is, the lower portion thereof, is arranged a sleeve 11, embracing the rod and adapted to be moved longitudinally thereof for the purpose of raising and lowering (vertically adjusting) the submerged portions of the meter. This sleeve is normally held against rotating on the rod by an upwardly extending lifting rod or connection 12, secured to a head fixed to the upper end of the sleeve. The sleeve is raised and lowered and held in the desired vertical adjustment by the lifting rod 12, which extends upwardly beside and approximately parallel with the main or supporting rod 1, and can be clamped thereto by one or more adjustable clamps 13, to maintain said sleeve 11, in the desired vertical position on and with respect to the main rod. These clamps 13, can be loosened when desired to permit vertical adjustment of the lifting rod.

The sleeve 11, carries the operative parts of the meter that are designed to be submerged and receive the pressure of the liquid under observation. For instance, I show a somewhat elongated horizontally disposed box 14, at its front end rigid with a vertical hub 15, mounted and freely rotatable on the sleeve 11, and carried and supported thereby and movable vertically therewith. This box or casing 14, is provided with a rearwardly projecting vane or rudder 150, designed to be acted on by the flow or current of the liquid in which the box is submerged, to maintain the box pointed upstream or in a position parallel with the direction of flow of the liquid as will be understood by those skilled in the art.

The box is internally, centrally and longitudinally divided into two separate non-communicating air or pressure chambers or compartments $a$, $b$, provided with openings to receive the pressure of the flowing liquid. The chamber $a$, is provided with any suitably arranged inlet or opening to receive the flowing liquid under velocity and static head pressures at the depth at which the observation is taken, while the chamber $b$, is provided with any suitably arranged liquid inlet or opening to receive the liquid under static head pressure alone. In the specific example illustrated, I show these inlets or openings provided through tubes A, B, rigid with the box 14, and projecting forwardly from the front end thereof. These tubes are usually of the same internal cross sectional capacity and at their rear ends open into the chambers $a$, $b$, respectively. The rear ends of the tubes preferably extend longitudinally of the bottom of the box and are fixed thereto with the rear portions of the tops of the tubes cut away and the tubes closed at their rear ends. The bottom of the box is formed with corresponding slots registering with the longitudinal open tops of the tubes so that the tubes will open into compartments $a$, $b$, through longitudinal slots about in the plane of the top walls of the tubes and longitudinally of both the tubes and compartments, see Figs. 8, 9, and 10, each slot in width being preferably about equal to the internal diameter of the tube. The tube A, is open at its front end $a'$, to receive the full force of the current plus the static head pressure and to convey the liquid under this combined pressure into the air box or compartment $a$. The tube B, is closed at its front end $b'$, but is formed with one or more lateral or radial liquid inlets $b''$, to receive the liquid at the static head pressure of the depth at which the observation is taken and to convey the liquid under this pressure into the air box or compartment $b$.

Suitable mechanism is provided connected with or operated by the pressure in chambers $a$, $b$, whereby the static head pressure can be accounted for or we might say subtracted, and the velocity head pressure can be converted into intelligible indications giving the velocity of the current per second, or other division of time, in feet and fractions thereof, or in other terms or divisions of linear measurement. Such converting and indicating mechanism or instrumentalities can be arranged in any suitable manner and supported by any suitable means and located at various points with respect to the submerged initial pressure receiving devices, and I do not wish to limit all features of my invention to mounting such instrumentalities on or carrying the same by the supporting rod 1. In the specific example illustrated, I show such instrumentalities carried by the rod 1, and fixed to the upper portion thereof, and comprising an upper hollow head 2, arranged a distance to one side of the rod 1, and fixed thereto by a suitable bracket $1^a$, and a lower hollow head 3, also fixed to the rod 1, by a suitable bracket $3^a$. These two heads are secured together by a pair of parallel spaced rods 4, 40, fixed thereto, and between said rods is arranged a vertical transparent glass or gage tube $c$, extending between said heads and carried thereby and opening thereinto. Behind said transparent tube $c$, and in coöperative relation to a liquid therein, is arranged a vertical indicating scale $d$, having visual indications or graduations on the face thereof running upwardly in feet and fractions of feet from a zero mark or indication. This scale $d$, is carried by a frame carried by and mounted on the rods 4, 40, preferably so as to be vertically adjustable on said rods and with respect to said transparent tube. The scale or plate can be provided with upper and lower forwardly extending arms $d'$, having vertical openings through which rods 4, 40, loosely pass, whereby the scale frame can slide vertically on the rods. The scale frame can be adjusted vertically and held in the desired vertical adjustment through the medium of a micrometer adjustment consisting of rotary thumb or finger nut 41, on the longitudinally threaded portion 42, of rod 4, and arranged under and upholding the scale frame through the medium of one of the arms $d'$. A coiled spring 43, can be provided to hold the scale frame down to the adjusting nut and to force the same down with the nut as the same is moved downwardly. This spring is shown encircling the rod 4, and compressed between a stop 44, fixed on rod 4, and the arm $d'$, resting on the nut. I do not however, wish to limit all features of my invention to such means for relatively adjusting the vertical positions of the scale and transparent tube. Other means for attaining this adjustment can be employed.

The lower head 3, is formed or provided with a closed fluid pressure chamber 30, and a suitable communicating passage $c'$, $c''$ is provided between this chamber, at a point below the fluid line or lever therein, and the lower end of the transparent tube. A pressure communicating passage $a^3$ is provided between the space above the fluid line in said chamber 30, and the air box or pressure chamber $a$, receiving the combined velocity and static head pressures through tube A. Various means or arrangements can be employed for thus communicating the pressure from chamber $a$, to chamber 30. In the specific example illustrated, I show a flexible tube $a''$, in open communication with chamber $a$, through a coupling nipple $a^5$ opening into the top of said chamber. This flexible tube $a''$, extends to the head 3, and its opposite end is coupled thereto through the medium of a depending nipple $a^4$, placing the tube in communication with a duct or passage $a^3$, opening into the top of the chamber 30, above the fluid level therein. A confined body of air is thus provided in the top of chamber 30, in the box or chamber $a$, in the tube $a''$, and in the communicating passages between said tube and chambers, and this confined body of air transmits the pressure received through tube A, to the fluid in chamber 30, and thereby tends to force said fluid upwardly in the transparent tube. A valve 31 is provided whereby passage $a^3$, can be closed when the instrument is not in use, to prevent escape of fluid from chamber 30. The submerged air chamber $b$, receiving the water pressure due to depth alone, is placed in communication with the space in the transparent tube above the fluid therein from chamber 30, so that the fluid in said tube is subjected to the pressure from chamber $b$, in opposition to the pressure from chamber $a$, and must rise in said tube against the pressure from chamber $b$.

Various means can be provided for establishing pressure transmitting communication from chamber $b$, to the transparent tube through the medium of a confined body of air, although in the specific example illustrated, I show a flexible tube $b^3$, coupled to the casing 14, and in open communication with the upper part of chamber $b$, through the medium of a suitable nipple $b^5$, while the opposite end of said tube is coupled to the projecting lower end of rod 4, said rod being formed by a tube in communication with tube $b^3$, and at its upper end opening into passage $b^4$, in the upper head 2, extending to and opening into the upper end of the transparent tube $c$. The confined body of air thus extends from the transparent tube above the fluid therein, through passage $b^4$, rod 4, flexible tube $b^3$, and chamber $b$, and the pressure of the water forced into chamber $b$, through tube or pipe B, is thus pneumatically transmitted to the surface of the fluid in the transparent tube. A suitable valve 20, can be arranged in the upper head 2, for the purpose of closing the passage $b^4$, when the instrument is not in use to prevent escape of the indicating fluid from chamber 30, through the transparent tube. The lower end of the gage or transparent tube $c$, is fitted in the head 3, in registration with a passage $c'$, in said head which is in open communication with the liquid in chamber 30, at a point approximately at the vertical and horizontal center of the chamber 30. This result is attained by fitting a tube or nipple $c''$, in the passage or duct with its bore in continuation thereof, said nipple projecting laterally into the chamber with its inlet at said central point therein. To reduce to the minimum the transmission of fluctuations in current pressure to the fluid in the gage tube $c$, the inner end of the nipple $c''$, is provided with a very small or minute inlet through a thin partition $c^3$, spanning the inner end of said nipple.

The operation of the device described will be readily understood by those skilled in the art. The pressure of the water in chamber $a$, is transmitted pneumatically to the fluid in chamber 30, tending to depress the fluid in said chamber and elevate the same in the gage tube. This pressure, however, is due to the velocity head of the current at the open end of tube A, plus the static head of the liquid at depth at which the tube A, is located. In order to correct the level of the fluid in the gage tube $c$, and bring the same to an elevation due solely to the pressure resulting from the velocity head of the current at the open end of tube A, the static head pressure of the liquid at the depth at which tube A, is located, is applied to the space in the gage tube $c$, above the fluid therein, to work against the pressure tending to elevate the fluid in said tube, hence when said column of fluid is balanced between these two forces, the elevation of the column above zero will be the result of the pressure due to current velocity. The level of the column of fluid in said gage tube read in connection with a properly located and prepared scale will give the velocity of the current in feet and fractions thereof, per second of time.

The device for vertically adjusting the scale, enables the operator to correct or set the instrument with the zero mark of the scale accurately coinciding or registering with the level of the fluid in the gage tube $c$, before the fluid is subjected to the water pressures, that is, before the instrument is submerged and the observation taken. The scale and indicating instrumentalities can be located at any suitable point above water and if carried by the rod 1, can be located at any desirable point thereon. In the specific example illustrated, I show the clamping devices 13, alike in construction, each consisting of a split sleeve clamp encircling the rod 1, and provided with a tightening screw 13′, and a hinged section clamp 13$^a$ carried by the split sleeve 13 and projecting laterally therefrom and provided with a tightening screw 13$^b$ and formed with side recesses to receive the two flexible tubes $a''$, $b^3$, and hold them in proper position with respect to the rod 1, and lifting element 12. The hinged section clamp 13$^a$ is adapted to receive the lifting element and lock the same to the rod 1, to hold the submerged box 14, and parts carried thereby in the desired vertical position. However, I do not wish to limit my invention to these clamps.

It is evident that this device might be adapted and utilized as a marine speedometer for indicating the speed of vessels through the water, and it is also evident that various changes, modifications, and variations might be resorted to without departing from the spirit and scope of my invention and hence I do not wish to limit myself to the exact disclosures hereof.

What I claim is:—

1. In current meters, a fluid chamber having an air space above the fluid level therein to receive fluid level depressing pressure impulses, a vertical tube in communication with the fluid in said chamber to maintain a fluid indicating column, means maintaining an air passage in communication with said tube above the fluid column therein to receive fluid column depressing pressure impulses, a current velocity indicating scale arranged adjacent to said tube, means providing a confined body of air including said air space and having a liquid inlet adapted to be submerged in the flowing liquid under observation and to admit liquid at the combined velocity and static head pressures and means providing another confined body of air in communication with said air passage and having a liquid inlet adapted to receive liquid at the static head pressure solely at the depth of the first mentioned inlet when taking an observation.

2. In current meters, in combination, a support, upper and lower heads carried thereby, means securing said heads together, a transparent tube between and carried by said heads, the upper head having an air passage in communication with the upper end of the tube and being provided with a valve whereby said passage can be closed, the lower head being provided with an indicating fluid chamber in communication with the lower end of the tube to maintain an indicating column of fluid in the tube, said lower head being provided with an air passage into the space in said chamber above the fluid level, and a valve for closing said last mentioned air passage.

3. In current meters and the like, a head forming an indicating fluid chamber and having an air passage opening into the chamber above the fluid level, means in communication with said chamber for maintaining an indicating column of fluid, the communicating means between the fluid in said chamber and said fluid column comprising a tubular member spanned by a thin partition having a minute fluid passage located below the fluid level in said chamber.

4. A current meter comprising a supporting rod at its upper portion carrying current velocity indicating mechanism comprising a scale and an adjacent indicating fluid column tube, and at its lower portion being provided with a member adapted to be submerged in the flowing liquid under observation and having liquid receiving openings, and pressure transmitting connections from said member to said mechanism.

5. A current meter comprising a supporting rod at its upper portion carrying current velocity indicating mechanism, and at its lower portion being provided with a member adapted to be submerged in the flowing liquid under observation and having liquid receiving openings, and air tubes from said member to said mechanism for transmitting pressure impulses pneumatically.

6. A current meter, or the like, comprising a supporting rod, a casing mounted thereon and rotatable to assume the proper position in the flowing liquid under observation and comprising a pressure chamber having a liquid inlet opening, an indicating mechanism comprising means to maintain an indicating column of fluid and a pressure chamber, and a tube connection for transmitting pressure impulses pneumatically from said pressure chamber of said casing to said pressure chamber of said indicating mechanism.

7. A current meter, or the like, comprising an elongated handle forming holding and supporting rod, pressure-actuated current velocity indicating mechanism, a casing carried by said rod and rotatable and provided with a rearwardly extending rudder and forming a pressure chamber and having an inlet opening for the liquid under observation, and a pressure transmitting connection from said chamber to said mechanism.

8. A current meter comprising a support, a casing carried thereby and provided with forwardly extending tubes, one of said tubes having an open front end, and the other tube being closed at the front end and having a side opening, said casing having separate chambers into which said tubes open respectively, pressure actuated current velocity indicating mechanism, and pressure transmitting connections from said chambers respectively to said mechanism.

9. A current meter, or the like, comprising indicating mechanism, a supporting rod, a vertically movable sleeve mounted on said rod and provided with means for raising and lowering the same and for securing the same in the desired vertical adjustment, and a casing carried by said sleeve and rotatably mounted thereon and provided with inlets for the liquid under observation.

10. A current meter provided with a casing adapted to be submerged in the liquid under observation, said casing being provided with a pair of forwardly projecting tubes, one tube being open at its front end, and the other tube being closed at its front end and having a side opening, said casing providing pressure chambers into which said tubes open, respectively.

11. In current meters a casing adapted to be held submerged in the liquid under observation and provided with a forwardly projecting tube having a liquid inlet, said tube at its rear portion being arranged longitudinally of the casing, said tube and casing being formed with an elongated narrow outlet, from the tube into the casing, arranged longitudinally of the tube.

12. A current meter comprising a box, an elongated handle-forming rod to hold the box submerged in the liquid under observation, said box having a forward inlet and being rotatable about a vertical axis and having means to maintain the box pointing directly into the current by the action of the current thereon.

13. A current meter comprising an elongated handle-forming rod, liquid pressure receiving means carried and adapted to be held submerged by said rod, and current velocity indicating mechanism carried by the upper portion of said rod, and having operative connection with said means.

14. A portable current meter comprising means for maintaining an indicating column of fluid, a current velocity indicating scale in coöperative relation with respect to said column, means providing separate confined bodies of air arranged to elevate and depress said fluid column, respectively, said last mentioned means having a reduced forwardly-opening velocity and static head liquid inlet to one of said air bodies, and a reduced laterally-opening static-head liquid inlet to the other of said air bodies, said inlets being arranged in approximately the same horizontal plane and adapted to be submerged in the liquid under observation, and an elongated handle-forming rod carrying said means and adapted to hold the same with said inlets submerged.

15. A current meter comprising a pressure-actuated current velocity indicating mechanism, means providing separate confined bodies of air arranged to act on said mechanism in opposition, said means comprising a box having separate chambers, one chamber having a forwardly opening velocity and static head liquid inlet, and the other chamber having a laterally opening static head liquid inlet, and means for holding said box submerged in the liquid under observation.

16. A current meter comprising a pressure-actuated current velocity indicating mechanism, means providing separate confined bodies of air acting in opposition on said mechanism, said means comprising a box having separate chambers receiving said bodies of air respectively, one chamber having a reduced velocity and static head liquid inlet into the bottom thereof, and the other chamber having a reduced static head liquid inlet into the bottom thereof, and means carrying said box and whereby the same can be held submerged into the liquid under observation.

17. A portable current meter comprising pressure-actuated indicating mechanism, a box having separate air chambers, operative connections from said chambers, respectively, to said mechanism, one chamber having a velocity and static head liquid inlet and the other chamber having a static head liquid inlet, means for holding said box submerged in the liquid under observation, said box being vertically and rotatably adjustable, and means for adjusting said box vertically and for holding the same in the desired adjustment.

18. A portable current meter comprising pressure-actuated indicating mechanism, a box having separate chambers, pipe connections from said chambers respectively, to said mechanism, one chamber having a velocity and static head liquid inlet and the other chamber having a static head liquid inlet, an elongated handle-forming rod carrying said mechanism and box and adapted to hold the box submerged in the liquid under observation, and means for adjusting the box vertically on said rod.

19. A current meter comprising pressure-actuated current velocity indicating mechanism, a box having chambers, operative connections from said chambers respectively to said mechanism, one chamber having a velocity and static head liquid inlet, and the other chamber having a static head inlet, an elongated rod for holding said box submerged, said box being rotatable about and movable longitudinally on said rod, and means for raising and lowering the box on the rod.

20. A current meter comprising an elongated handle-forming rod, a box mounted thereon and adjustable longitudinally thereof and having liquid inlets, pressure-actuated indicating mechanism, pipe connections from said box to said mechanism, and a lifting rod for raising and lowering said box on said handle-forming rod.

21. A current meter comprising means for maintaining an indicating column of fluid, a current velocity indicating scale in coöperative relation with respect to said column, and means providing separate confined bodies of air arranged to elevate and depress said fluid column, respectively, said last mentioned means having a reduced forwardly-opening velocity and static head liquid inlet to one of said air bodies, and a reduced laterally-opening static-head liquid inlet to the other of said air bodies, said inlets being arranged in approximately the same horizontal plane and adapted to be submerged in the liquid under observation.

22. A current meter comprising a pressure-actuated current velocity indicator embodying an indicating column of fluid, an air pressure chamber having a reduced velocity and static head liquid inlet, means providing a pneumatic connection from said chamber to transmit pressure from said chamber to elevate said fluid column, another air pressure chamber having a reduced static head liquid inlet, and means providing a pneumatic connection from said last mentioned chamber to transmit pressure therefrom to depress said fluid column, said chambers being adapted to be held with their said inlets submerged in the liquid under observation.

23. A current meter comprising a box forming separate air pressure chambers, a pressure actuated indicator, air pressure pipe connections from said chambers, respectively, to said indicator, and a handle forming rod carrying said box and for holding the same submerged in the liquid under observation, said chambers having liquid inlets.

24. A portable current meter comprising an elongated handle forming rod adapted to be held to the bottom of a stream under observation with its upper portion extending above the water level, a pressure actuated current velocity indicator carried by the upper portion of said rod, means to transmit velocity head pressure plus static head pressure to said indicator, and means to transmit static head pressure to said indicator in opposition to said velocity head pressure plus static head pressure.

25. In a current meter, in combination, a box forming two internal air pressure chambers, each chamber having a reduced liquid inlet tube extending forwardly therefrom and at its rear end arranged longitudinally of the floor of its chamber and opening thereinto through said floor.

26. In a current meter, in combination, opposite heads, rods connecting said heads, one of said rods being tubular, one of said heads having a passage in continuation of said tubular rod, a transparent indicating fluid column tube secured to and between said heads and opening at one end into said passage, the other head forming a chamber for said indicating fluid and having a fluid passage from said chamber to the lower end of said tube and an air passage opening into said chamber above the fluid level therein.

27. In a current meter, in combination, end heads, rods connecting said heads, an indicating fluid column tube arranged between and carried by said heads, a vertically adjustable scale having guides slidable longitudinally on said rods, one of said rods having a screw threaded portion, a nut on said threaded portion and adjustable longitudinally of said rod and determining the adjustment of said scale, and a spring yieldingly holding said scale to said nut.

In testimony whereof I affix my signature, in presence of two witnesses.

GEORGE CLARK BUCK.

Witnesses:
 MARGARET E. BUCK,
 ABBY B. BUCK.